(12) United States Patent
Moine et al.

(10) Patent No.: US 12,065,982 B2
(45) Date of Patent: Aug. 20, 2024

(54) DIAGNOSIS OF A FAULT IN THE VALVE PLAY OR THROTTLE OF A LAWNMOWER

(71) Applicant: VITESCO TECHNOLOGIES GMBH, Regensburg (DE)

(72) Inventors: Xavier Moine, Toulouse (FR); Yohan Dupouy, Toulouse (FR)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 18/012,192

(22) PCT Filed: Aug. 12, 2021

(86) PCT No.: PCT/EP2021/072540
§ 371 (c)(1),
(2) Date: Dec. 21, 2022

(87) PCT Pub. No.: WO2022/053256
PCT Pub. Date: Mar. 17, 2022

(65) Prior Publication Data
US 2023/0265807 A1   Aug. 24, 2023

(30) Foreign Application Priority Data
Sep. 14, 2020 (FR) ...................... 2009269

(51) Int. Cl.
*F02D 41/22* (2006.01)
*F02D 41/14* (2006.01)
(Continued)

(52) U.S. Cl.
CPC ......... *F02D 41/22* (2013.01); *F02D 41/1454* (2013.01); *F02D 41/182* (2013.01);
(Continued)

(58) Field of Classification Search
CPC .... F02D 41/1454; F02D 41/182; F02D 41/22; F02D 41/2454; F02D 2200/0404; F02D 2200/0406
See application file for complete search history.

(56) References Cited

U.S. PATENT DOCUMENTS 6,647,959 B2   11/2003   Noguchi
8,024,109 B2   9/2011    Fuwa
(Continued)

FOREIGN PATENT DOCUMENTS

CN   206208174   5/2017
CN   107091629   8/2017
(Continued)

OTHER PUBLICATIONS

Suzuki, WO 2015/060068, machine translation. (Year: 2015).*
(Continued)

*Primary Examiner* — Hung Q Nguyen
*Assistant Examiner* — Mark L. Greene
(74) *Attorney, Agent, or Firm* — NIXON & VANDERHYE

(57) ABSTRACT

Disclosed is a method for establishing an engine maintenance diagnosis. The engine includes a throttle which regulates air access into an air intake system of the engine, a position sensor which measures the position of the throttle, a manifold in fluidic communication with the throttle, a pressure sensor which measures the pressure in the manifold, at least one intake valve, a richness probe which measures an oxygen level and a richness controller for modifying the proportions of air and fuel in the air-fuel mixture. The method uses two air flow measurements in order to identify a problem in the throttle or the play at the valves.

20 Claims, 1 Drawing Sheet

(51) Int. Cl.
  *F02D 41/18* (2006.01)
  *F02D 41/24* (2006.01)
(52) U.S. Cl.
  CPC .. *F02D 41/2454* (2013.01); *F02D 2200/0404* (2013.01); *F02D 2200/0406* (2013.01)

(56) References Cited

U.S. PATENT DOCUMENTS

| | | | |
|---|---|---|---|
| 10,947,922 | B2 | 3/2021 | Yamada et al. |
| 2003/0183194 | A1 | 10/2003 | Noguchi |

FOREIGN PATENT DOCUMENTS

| | | |
|---|---|---|
| CN | 206862260 | 1/2018 |
| CN | 107727040 | 2/2018 |
| CN | 107762583 | 3/2018 |
| CN | 107859542 | 3/2018 |
| CN | 207256106 | 4/2018 |
| CN | 207261062 | 4/2018 |
| EP | 1 715 165 | 10/2006 |
| EP | 3 594 481 | 1/2020 |
| JP | 2003286883 A | 10/2003 |
| JP | 2006118382 A | 5/2006 |
| JP | 2018-59415 | 4/2018 |
| JP | 2019065821 A | 4/2019 |
| WO | 2006/114393 | 11/2006 |
| WO | 2015/060068 | 4/2015 |

OTHER PUBLICATIONS

International Search Report and Written Opinion of the ISA dated Nov. 30, 2021, for PCT/EP2021/02540, 16 pp.
Office Action, issued in Japanese Patent Application No. 2023-506577 dated Feb. 19, 2024.

* cited by examiner

DIAGNOSIS OF A FAULT IN THE VALVE PLAY OR THROTTLE OF A LAWNMOWER

CROSS-REFERENCE TO RELATED APPLICATIONS

This application is the U.S. national phase of International Application No. PCT/EP2021/072540 filed Aug. 12, 2021, which designated the U.S. and claims priority to FR 2009269 filed Sep. 14, 2020, the entire contents of each of which are hereby incorporated by reference.

BACKGROUND OF THE INVENTION

Field of the Invention

The present invention concerns performance of a maintenance diagnosis for the engine and in particular a method for revealing a maintenance need for an engine due to clogging and/or an air leak at a throttle or valve. Such an engine is intended to power a lawnmower.

Description of the Related Art

In the lawnmower sector, maintenance is traditionally performed after a certain number of operating hours. This means that a maintenance diagnosis is performed by a computer on the basis of an operating hours counter even though the lawnmower need not necessarily be serviced.

In particular, today no monitoring function is available for establishing a fault at the throttle, such as clogging, for lawnmowers. It is not therefore possible to perform a maintenance diagnosis for this problem. Nor is it possible to perform a maintenance diagnosis for a problem of play at an intake valve. It is however known that when these elements suffer wear over time, they have a strong impact on the good function of the engine—not only with respect to lawnmowers. In fact both are used in the air intake so as to control the flow of air and/or the air-fuel mixture supplying the engine. In this respect, it is advantageous to be able to reveal when one of these two elements is no longer functioning correctly and requires maintenance. In particular, it is even more advantageous to establish which element of the two has a malfunction.

Although the solution presented in the present application is implemented in a lawnmower engine, this is a purely illustrative and not limitative example. In fact the elements concerned are not specific to lawnmowers and the solution may quite easily be implemented in engines for different applications, in particular engines of motor vehicles.

SUMMARY OF THE INVENTION

It is an object of the present application to propose a method which reveals when an engine requires maintenance because of a fault in its air intake system.

More precisely, an object of the present application is to identify the point of the air intake at which this fault is located, and in particular whether it is a fault at the throttle or at an intake valve, so as to facilitate maintenance of the engine.

Another object of the invention is to reveal this fault with hardware components which are already present on the engine, so as to avoid increasing the complexity of the system and leading to additional integration costs.

To this end, the present application proposes a method for establishing a maintenance diagnosis on an engine, the engine comprising a throttle which regulates air access into an air intake system of said engine, a position sensor which measures the position of the throttle, a manifold in fluidic communication with the throttle, a pressure sensor which measures the pressure in the manifold, at least one intake valve, a richness probe which measures an oxygen level and a richness controller for modifying the proportions of air and fuel in the air/fuel mixture, the method being characterized in that it comprises a first set of steps implemented at the end of the production line for the engine or following maintenance of said engine, the first set of steps comprising the following steps:

ignition of the engine, and when the engine is in predetermined conditions, determination of a first air flow $db_{TPS}$ in the air intake system from the position $V_{TPS\_mesure}$ of the throttle measured by the position sensor, determination of a second air flow $db_p$ in the air intake system from the pressure $P_{mesure}$ in the manifold measured by the pressure sensor, determination of a reference measurement correction factor $F_{ref}$ selected such that when it is added to the measurement of one of the two air flows $db_p$ or $db_{TPS}$ in the determination of a third corrected air flow $db_{cor}$ based on the same calculation as said one of the two air flows $db_p$ or $db_{TPS}$, the third corrected air flow $db_{cor}$ is substantially equal to the other said one of the two flows, correction of a theoretical injection command $C_{inj}$ of the richness controller, determined from one of the two air flows $db_{TPS}$ or $db_p$, by the addition of a reference injection correction factor $LCL_{ref}$ so as to obtain a substantially stoichiometric air-fuel mixture on the basis of measurements from the richness probe, and after at least one determined duration $T_{calibrage}$ during which the steps of determination of the first air flow $db_{TPS}$, determination of the second air flow $db_p$, determination of the reference measurement correction factor $F_{ref}$ and correction are performed several times, storage of the reference measurement correction factor $F_{ref}$ and the reference injection correction factor $LCL_{ref}$, and in that it comprises a second set of steps implemented during conventional operation of the engine and when the engine is in said predetermined conditions, the second set of steps comprising the following steps:

determination of a first air flow $db'_{TPS}$ in the air intake system from a position $V'_{TPS\_mesure}$ of the throttle measured by the position sensor, determination of a second air flow $db'_p$ in the air intake system from a pressure $P'_{mesure}$ in the manifold measured by the pressure sensor, determination of a current measurement correction factor $F_{courant}$, selected such that when it is added to the measurement of said corresponding one of the two air flows $db'_{TPS}$ or $db'_p$ in the determination of a third corrected air flow $db'_{cor}$ based on the same calculation as said one of the two air flows $db'_{TPS}$ or $db'_p$, the third corrected air flow $db'_{cor}$ is substantially equal to the other said one of the two flows $db'_{TPS}$ or $db'_p$, correction of an injection command $C'_{inj}$ of the richness controller determined from the corresponding air flow by the addition of a current injection correction factor $LCL_{courant}$ so as to obtain a substantially stoichiometric air-fuel mixture on the basis of measurements from the richness probe, and when the absolute value of the difference between the reference measurement correction factor $F_{ref}$ and the current measurement correction factor $F_{courant}$ is greater than a determined threshold, establishment of a maintenance diagnosis, calculation of an absolute value $V_{com}$ of the difference between the reference injection correction factor $LCL_{ref}$ and the current injection correction factor $LCL_{courant}$, and:

1) when the absolute value $V_{com}$ is less than a determined threshold, if the injection command $C'_{inj}$ is determined from the first air flow $db'_{TPS}$ obtained from the position of the throttle, establishment of a diagnosis of a play at the at least one intake valve, and if the injection command $C'_{inj}$ is determined from the second air flow $db'_p$ obtained from the manifold pressure, establishment of a diagnosis of clogging of the throttle, or 2) when the value $V_{com}$ is greater than said determined threshold, if the injection command is determined from the first air flow $db'_{TPS}$ obtained from the position of the throttle, establishment of a diagnosis of clogging of the throttle, and if the injection command is determined from the second air flow $db'_p$ obtained from the manifold pressure, establishment of a diagnosis of a play at the at least one intake valve.

The invention also provides a computer configured for controlling an ignition of the engine and a richness controller, and for receiving measurements from a position sensor of a throttle, a manifold pressure sensor, and a richness probe. The computer is also adapted for implementing the steps of the method presented above.

The invention furthermore provides a computer program product comprising code instructions recorded on a support legible by a computer ECU, comprising a memory for implementing the steps of the method explained above when said program is executed on a computer ECU comprising a memory.

Finally, the invention provides an engine, characterized in that it comprises a throttle which regulates air access into an air intake system of said engine, a position sensor which measures the position of the throttle, a manifold in fluidic communication with the throttle, a pressure sensor which measures the pressure in the manifold, at least one intake valve, a richness probe which measures an oxygen level and a richness controller for modifying the proportions of air and fuel in the air-fuel mixture, and in that it also comprises a computer implementing the method explained above.

The features disclosed in the paragraphs below can optionally be implemented. They can be implemented independently of each other or in combination with each other:

In one embodiment, the determined conditions of the engine may comprise an engine temperature between two first predetermined thresholds, an air temperature between two second predetermined thresholds, an air flow in the air intake system between two third predetermined thresholds, an engine speed between two fourth predetermined thresholds for a duration at least equal to a fifth determined threshold, and an engine load between two sixth predetermined thresholds.

According to one embodiment, on each ignition of the engine, the current measurement correction factor $F_{courant}$ and the current injection correction factor $LCL_{courant}$ may be initialized respectively to the current reference correction factor $F_{courant}$ and the current injection correction factor $LCL_{courant}$ calculated in one of the iterations prior to switching off the engine.

According to one embodiment, the step of storage may be implemented after the engine has been switched off.

According to one embodiment, the engine may be mounted in a lawnmower.

The method according to the invention therefore allows performance a maintenance diagnosis of an engine when necessary. The method also allows better maintenance of engines since it is able to detect which element should be the object of said maintenance. In this respect, the method described above allows an increase in the service life of engines, and in particular lawnmower engines. Also, as the method requires no element which is not already present on the engine, it does not entail any additional complexity of integration, and consequently no extra cost for either manufacturers or users.

With specific regard to lawnmowers, it also allows users to reduce the costs associated with maintenance of their lawnmower insofar as a maintenance alert is no longer necessarily triggered solely on the basis of a time counter, but also when a real problem is detected in the air intake system of the engine of the lawnmower.

BRIEF DESCRIPTION OF THE DRAWINGS

Other characteristics, details and advantages will become apparent from reading the following detailed description and from analyzing the appended drawings, in which.

DESCRIPTION OF THE PREFERRED EMBODIMENTS

Figure 1:
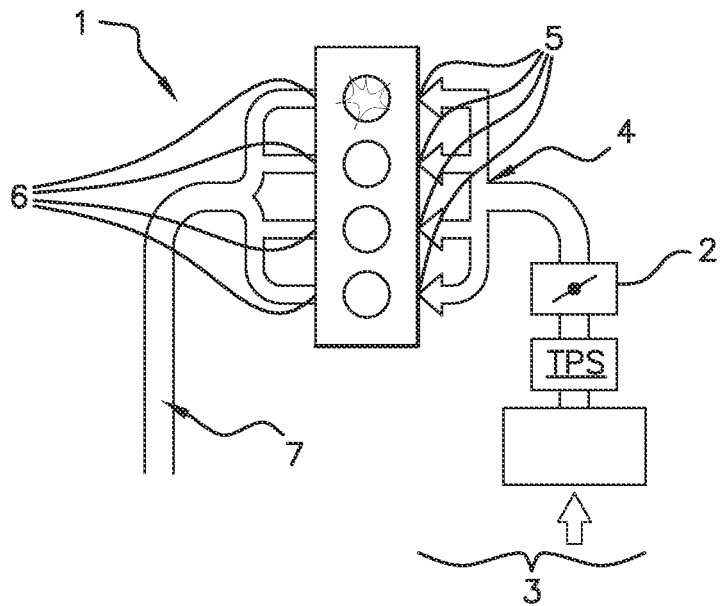
FIG. 1 shows an embodiment of an air intake and exhaust system of an engine.

Reference is now made to [FIG. 1] showing, in non-exhaustive fashion, an engine 1. Although the method has been performed in a lawnmower engine, it is applicable to all types of engine and in this respect, the example of the lawnmower is given here purely for illustration and without being limitative.

The engine 1 comprises an air intake system 3 shown on the right of the figure. The air intake system 3 comprises a throttle 2 mounted in a housing and controlling the access of air into the interior of said intake system. The position of the throttle 2 is measured by a position sensor TPS. The air intake system 3 also comprises a manifold in fluidic communication with the throttle housing 2. A pressure sensor 4 measures the pressure inside the manifold. Also, at least one intake valve 5 is in fluidic communication with the manifold.

The left side of FIG. 1 shows the exhaust system of the lawnmower engine 1, comprising as many exhaust valves 6 as the air intake system 3 comprises intake valves 5. The exhaust system also comprises a richness probe 7 allowing measurement of an oxygen level in the exhaust. This oxygen level is used to determine a richness of an air-fuel mixture introduced into the engine 1. In this respect, the air-fuel mixture is described as lean when it has too little fuel relative to the quantity of air, and rich when it has more than necessary. In this case, the richness probe is based on a threshold separating the lean mixture from the rich mixture, said threshold symbolizing an ideal air-fuel mixture known as stoichiometric. More precisely, the stoichiometric mixture corresponds to the air-fuel ratio which allows a correctly balanced reaction (combustion) between the air and the fuel.

Figure 2:
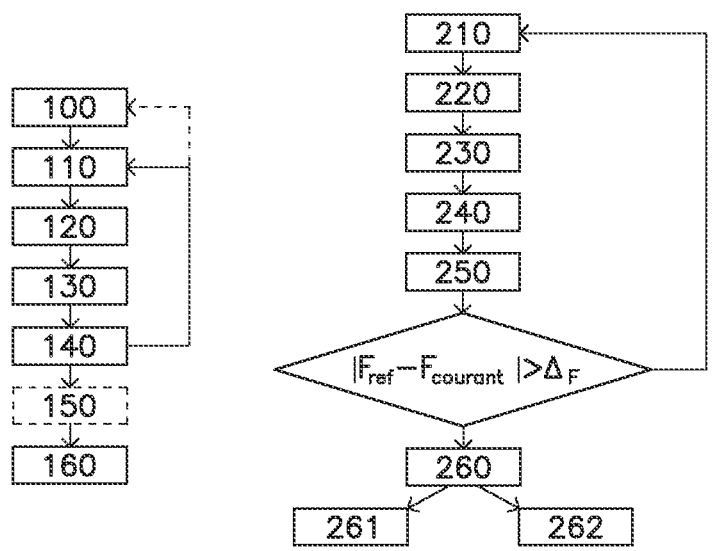
FIG. 2 shows an embodiment of a method for establishing a maintenance diagnosis of the air intake system of an engine.
Figure 3:
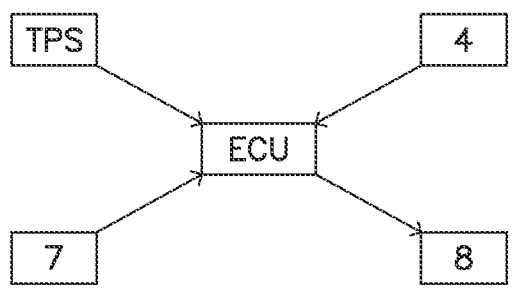
FIG. 3 shows an embodiment of different connections between a computer and other elements of the engine, allowing implementation of the method for establishing the maintenance diagnosis of the air intake system of the engine.

With reference to FIG. 3, the function of the lawnmower engine 1 is ensured by a computer ECU which controls the ignition, amongst other factors. The computer ECU also receives information from the position sensor TPS, the manifold pressure sensor 4 and the richness probe 7. In particular, it controls a richness controller 8 which is used to deliver fuel injection commands $C_{inj}$. The computer ECU also comprises a memory for implementing a method for establishing a maintenance diagnosis for the engine 1, which is described below with reference to FIG. 2.

The method comprises two separate phases, each with a set of steps. The first phase (on the left in FIG. 2) is carried out when the engine 1 leaves the production line or after a maintenance process. The phrase "leave the production line" here means that the engine 1 is new, in other words has never yet been used. The second phase (on the right in FIG. 2) is carried out during conventional operation of the engine. The phrase "conventional operation of the engine 1" here means any operation of the engine 1 except when it is in the first phase. In this case, the engine 1 is no longer new nor has it just undergone a maintenance operation, i.e. it has functioned for at least a duration $T_{calibrage}$ under predetermined conditions. The definition of the duration $T_{calibrage}$ and the predetermined conditions will be specified below.

In the first phase, the method aims to determine two reference correction factors. A first factor corresponds to a reference correction factor $F_{ref}$ of a measurement by the position sensor TPS for the throttle 2, or that by the manifold pressure sensor 4. A second factor corresponds to a reference injection correction factor $LCL_{ref}$ for an injection command $C_{inj}$ supplied by the richness controller 8. These reference correction factors have a value of zero when the lawnmower is new, and are also re-initialized to this zero value following a maintenance operation of the vehicle.

In the second phase, the method monitors a first current measurement correction factor $F_{courant}$ and when this diverges too far from the reference measurement correction factor $F_{ref}$ determined during the first phase, a maintenance diagnosis is performed. Also, monitoring the divergence of a second current correction factor $LCL_{courant}$ for an injection command $C'_{inj}$ supplied by the richness controller 8 relative to the reference correction factor $LCL_{ref}$ will allow determination of whether the fault arises from play at the at least one intake valve 5 or from the throttle 2.

Thus a first step of the method corresponding to the first step of the first set of steps of the first phase comprises ignition 100 of the lawnmower engine 1. In this case, the aim is to put the engine 1 into predetermined conditions so as to be able to determine the reference factors $F_{ref}$ and $LCL_{ref}$.

Only when the engine is in the predetermined conditions does the method implement the second step.

The predetermined conditions of the engine 1 comprise an engine temperature between two first predetermined thresholds. They also comprise an air temperature between two second predetermined thresholds. They also comprise an air flow in the air intake system between two third predetermined thresholds. They also comprise an engine speed between two fourth predetermined thresholds for a duration at least equal to a fifth determined threshold. They finally comprise an engine load between two sixth predetermined thresholds.

As soon as these conditions are fulfilled simultaneously, the method implements the following step. However, as soon as one of these conditions is no longer valid, the method is temporarily stopped.

In order to determine the two reference correction factors $F_{ref}$ and $LCL_{ref}$, advantageously all of these conditions must be present for a determined duration $T_{calibrage}$ corresponding to a cumulative duration. A cumulative duration here means that the duration $T_{calibrage}$ may be identified as a time counter, and soon as all the determined conditions above are fulfilled, the time counter is incremented up to the duration $T_{calibrage}$. It is not reset to zero on stoppage of the engine 1 but only when the vehicle has undergone a maintenance operation. It is of course at zero when the engine 1 leaves the production line.

Thus when the predetermined conditions are fulfilled, the method implements a second step of determination 110 of a first air flow $db_{TPS}$ in the air intake system 3 from the position $V_{TPS\_mesure}$ of the throttle 2 measured by the position sensor TPS. In concrete terms, the position sensor TPS sends a position measurement $V_{TPS\_mesure}$ to the computer ECU of the engine 1 which determines, from said measurement $V_{TPS\_mesure}$, the air flow $db_{TPS}$ in the air intake system.

A third step of the method comprises the determination 120 of a second air flow $db_p$ in the air intake system 3 from the manifold pressure $P_{mesure}$ measured by the pressure sensor 4. As for the position sensor TPS, the pressure sensor 4 sends a pressure measurement $P_{mesure}$ for the pressure prevailing in the manifold to the computer ECU, which determines, from said measurement $P_{mesure}$, the second air flow $db_p$ in the air intake system.

We now have two air flows $db_{TPS}$ and $db_p$ in the air intake system of the engine 1. Under perfect conditions, the two flow values should be the same. However, even if the vehicle is new or has just undergone a maintenance operation, this is not generally the case, and $d_{bTPS} \pm db_p$. It is known that the difference between the two air flows equates to an imperfection in the tightness in the play of the at least one intake valve 5 or a clogging at the throttle 2. When the engine 1 is in the first phase, it is considered that this imperfection is minimal since the engine is deemed to be new or just serviced.

A fourth step of the method comprises determination 130 of a reference throttle correction factor $F_{ref}$. The reference throttle correction factor $F_{ref}$ is selected such that when it is added to the measurement $V_{TPS\_mesure}$, the sum of the two elements $V_{TPS\_mesure} + F_{ref}$ should give a third corrected air flow $db_{cor}$ substantially equal to the second air flow $db_p$ ($db_{cor} = db_p$). Calculation of this third corrected air flow $db_{cor}$ should be based on the same calculation performed for determining the first air flow $db_{TPS}$, with replacement of the measurement $V_{TPS\_mesure}$ by the sum $V_{TPS\_mesure} + F_{ref}$.

The aim here is to harmonize the first air flow $db_{TPS}$ obtained from the position of the throttle 2 and the second air flow $db_p$ obtained from the manifold pressure.

The computer ECU is thus able to determine a reference throttle correction factor $F_{ref}$ used to calculate the third corrected air flow $db_{cor}$ so as to compensate for the original discrepancy between the first air flow $db_{TPS}$ and the second air flow $db_p$.

Naturally, it is sufficient to correct one of the two measurements to harmonize the two air flows. In this sense, the correction factor $F_{ref}$ could be applied to the pressure measurement $P_{mesure}$ and the third air flow $db_{cor}$ would then be determined on the basis of calculation of the second air flow $db_p$. The third air flow $db_{cor}$ would then be substantially equal to the first air flow $db_{TPS}$ ($db_{cor}=db_{TPS}$) without prejudice to the good function of the method.

A fifth step of the method comprises correction 140 of an injection command $C^{inj}$ from the richness controller 8 by the addition of a reference injection correction factor $LCL_{ref}$. This correction is performed with the aim of obtaining a stoichiometric air-fuel mixture based on the measurements of the richness probe 7. The air-fuel mixture should be ideal and hence stoichiometric, but it fluctuates under real operating conditions. The computer ECU then receives measurements from the richness probe 7 and determines a reference injection correction factor $LCL_{ref}$. The latter is sent to the richness controller 8 so that it supplies the modified injection command $C_{inj} \times (1+LCL_{ref})$, taking into account both the theoretical injection command $C_{inj}$ and the reference injection correction factor $LCL_{ref}$ established under real conditions.

Also, the theoretical injection command $C_{inj}$ is obtained from one of the first two air flows $db_{TPS}$ and $db_p$. In fact, since the stoichiometric mixture is based on an ideal air-fuel ratio, the injection command $C_{inj}$ is determined as a function of the air flow in the air intake system.

Advantageously, the theoretical injection command $C_{inj}$ obtained from the air flow for which the calculation is not used to determine the third corrected air flow. In other words, if the reference measurement correction factor $F_{ref}$ is added to the measurement $V_{TPS\_mesure}$ of the position of the throttle 2, the injection command will be based on the air flow obtained from the manifold pressure. However, if the correction factor is added to the pressure measurement $P_{mesure}$, the injection command will be based on the air flow obtained from the position of the throttle 2.

It is understood here that by performance of steps 110 to 140 presented above, two reference correction factors are obtained, one for the throttle $TPS_{ref}$ and one for the injection $LCL_{ref}$. However, in order for these reference correction factors to be actually representative of the corrections to be made in order to give both a substantially constant air flow between the two calculated air flows, and a substantially stoichiometric air-fuel mixture, it is necessary to repeat said steps several times. In fact insofar as the first corrections may be rough corrections, the first set of steps is performed several times in order to be able to store accurate reference correction factors. These then allow optimization of the operation of the engine 1 by aiming to obtain an air-fuel mixture which comes as close as possible to the stoichiometric mixture, thus guaranteeing an ideal theoretical efficiency of the engine 1. For this reason, FIG. 2 shows a loop back to the step 110 of determining the first air flow $db_{TPS}$ of the method.

The reference correction factors for the throttle $F_{ref}$ and injection $LCL_{ref}$ are only stored when the first set of steps has been performed for a determined duration $T_{calibrage}$ during which the steps of determination 110 of the first air flow $db_{TPS}$, determination 120 of the second air flow $db_p$, determination 130 of the reference throttle correction factor $F_{ref}$ and correction 140 have been performed several times.

Advantageously, the step of storage 160 is only implemented after the engine 1 has been switched off 150.

As explained above, the determined duration $T_{calibrage}$ is cumulative and acts as a time counter. This means that even if the engine 1 is switched off, as soon as it is switched on again and in the predetermined conditions, the time counter is incremented without being returned to zero, and as soon as it reaches the duration $T_{calibrage}$, the correction factors for throttle $F_{ref}$ and injection $LCL_{ref}$ are stored in the memory of the computer ECU definitively until the next maintenance operation. This measure also includes temporary storage of these values in the memory of the computer ECU during the first phase until the duration $T_{calibrage}$ is reached, so as not to start again from the beginning of calibration (or adaptation) of the correction factors as soon as the engine is switched off. For this reason, a loop (dotted lines) is also shown from the correction step 140 back to the step 100 of ignition of the engine.

In this case, the correction factors for the throttle $F_{ref}$ and injection $LCL_{ref}$ represent the correction values when the engine is in good condition, since they are acquired when the engine is new or when the engine has just undergone a maintenance operation.

The storage 160 of the reference correction factors terminates the first phase of the method and is thus the final step of the first set of steps.

Now, during the second phase of the method, i.e. during the traditional operation of the engine 1, the current correction factors must be recovered and compared to the reference correction factors $F_{ref}$ and $LCL_{ref}$ in order to reveal a fault. The first steps of the second set of steps are now the same as those of the first phase.

Thus when the engine 1 is in the predetermined conditions, a first step of the second set of steps comprises determination 210 of a first air flow $db'_{TPS}$ in the air intake system from a position $V'_{TPS\_mesure}$ of the throttle 2 measured by the position sensor TPS.

A second step comprises determination 220 of a second air flow $db'_p$ in the air intake system from a pressure $P'_{mesure}$ in the manifold measured by the pressure sensor 4.

A first step comprises determination 230 of a current throttle correction factor $F_{courant}$, selected such that when added to the measurement $V'_{TPS\_mesure}$ in a determination of a third corrected air flow $db'_{cor}$ based on the same calculation as the first air flow $db'_{TPS}$, the third corrected air flow $db'_{cor}$ is substantially equal to the second air flow $db'_p$.

In this third step of determination 230 of the second set of steps, it is of course considered that the current measurement correction factor $F_{courant}$ is determined from the same air flow as that used during determination of the reference measurement correction factor $F_{ref}$ of the first set of steps, so as to be able to compare the two results.

A fourth step comprises correction 240 of a theoretical injection command $C'_{inj}$ of the richness controller 8, determined from the corresponding air flow, by the addition of a current injection correction factor $LCL_{courant}$ so as to obtain a substantially stoichiometric air-fuel mixture on the basis of measurements from the richness probe 7. In this case here, the corresponding air flow corresponds to that which was selected during the first phase in order to determine the reference injection correction factor $LCL_{ref}$. For example, if in the first phase the second air flow $db_p$ was selected for determining the theoretical injection command $C_{inj}$, it is the second air flow $db'_p$ obtained from the pressure measurement $P'_{mesure}$ which is selected during this phase. In this way, it is possible to compare the current injection correction factor $LCL_{courant}$ and the reference injection correction factor $LCL_{ref}$.

It is understood that determination of these current correction factors allows optimization of the operation of the engine 1 throughout its life, by aiming to adapt the air-fuel mixture continuously such that it comes as close as possible to the stoichiometric mixture. In fact, as in the first phase, this is an adaptation to the actual conditions of use of the engine 1.

In a preferred embodiment, the current correction factors for measurement $F_{courant}$ and injection $LCL_{courant}$ are stored in the memory of the computer ECU on each iteration of the method. Thus the current correction factors calculated at an iteration i replace in the memory the current correction factors calculated at an iteration $i_{-1}$ preceding the iteration i.

Thus on each ignition of the engine, the current correction factors may be directly initialized to the respective values stored in the memory corresponding to the last values they had before the engine was switched off.

It is also considered here that the current correction factors may be stored in the memory in replacement of previous ones, not on each iteration but on every n iterations, for example, or simply regularly.

At the end of the fourth step 240 of correction, the computer ECU is in possession of all information which may reveal the existence of fault.

Thus when the absolute value of the difference between the reference throttle correction factor $F_{ref}$ and the current throttle correction factor $F_{courant}$ is greater than a determined threshold $\Delta_F$, in a fifth step 250, a fault diagnosis is made. In fact, a significant discrepancy between the reference throttle correction factor $F_{ref}$ and the current throttle correction factor $F_{courant}$ indicates a significant difference between the results of the calculation of the two air flows $db'_{TPS}$ and $db'_p$. This difference is explained by a fault in the tightness in the play of the at least one intake valve 5 or a clogging at the throttle.

Now the cause of the fault must be established by identifying which air flow has diverged.

The injection command from the richness controller 8 comprises two terms, a first term corresponding to the theoretical command $C'_{inj}$ determined from one of two air flows to which an injection correction factor is added, $C'_{inj} \times (1+LCL_{courant})$. Under the predetermined conditions of the engine 1, if the current injection correction factor $LCL_{courant}$ is almost equal to the reference injection correction factor ($LCL_{courant} \approx LCL_{ref}$), then the theoretical commands $C_{inj}$ and $C'_{inj}$ are almost equal ($C_{inj} \approx C'_{inj}$) and hence the flows from which they were estimated (for example, the air flows $db_p$ and $db'_p$ determined from the pressure measurement $P_{mesure}$) are also almost equal ($db_p \approx db'_p$). In this case, it is not the air flow $db'_p$ of the second phase which has diverged relative to the air flow $db_p$ of the first phase. It is the other air flow $db'_{TPS}$ which has diverged in the second phase and which indicates that the fault is located there.

The method thus comprises a sixth step 260 of calculation of an absolute value $V_{com}$ of the difference between the reference injection correction factor $LCL_{ref}$ and the current injection correction factor $LCL_{courant}$, ($V_{com}=|LCL_{ref}-LCL_{courant}|$).

From this, four different cases can be distinguished and are presented below:

1) When the value ($V_{com}$) is less than a determined threshold $\Delta_{LcL}$ ($V_{com}<\Delta_{LcL}$):
   if the theoretical injection command $C'_{inj}$ is determined from the air flow $db_{TPS}$ obtained from the throttle position, establishment 261 of a diagnosis of the presence of a play at the at least one intake valve 5, and
   if the theoretical injection command $C'_{inj}$ is determined from the air flow $db_p$ obtained from the manifold pressure, establishment 262 of a diagnosis of a fault at the throttle 2.
2) When the value ($V_{com}$) is greater than said determined threshold $\Delta_{LcL}$ ($V_{com}>\Delta_{LcL}$):
   if the theoretical injection command $C'_{inj}$ is determined from the air flow $db_{TPS}$ obtained from the throttle position, establishment 262 of a diagnosis of a fault at the throttle 2, and
   if the theoretical injection command $C'_{inj}$ is determined from the air flow $db_p$ obtained from the manifold pressure, establishment 261 of a diagnosis of the presence of a play at the at least one intake valve 5.

The method may be implemented in internal combustion engines comprising the elements present in FIG. 1. In particular, this method may be implemented in conventional lawnmowers for which engine maintenance is based only on an operating hours counter and not on an actual fault diagnosis.

The invention claimed is:

1. A method for establishing a maintenance diagnosis on an engine including a throttle which regulates air access into an air intake system of said engine, a position sensor which measures at least one position of the throttle, a manifold in fluidic communication with the throttle, a pressure sensor which measures at least one pressure in the manifold, at least one intake valve, a richness probe which measures an oxygen level, and a richness controller configured to modify proportions of air and fuel in an air-fuel mixture, the method comprising:
   implementing a first set of steps at the end of a production line for the engine or following maintenance of said engine, the first set of steps comprising:
      switching on the engine, and when the engine is in predetermined conditions,
      determining a first air flow in the air intake system from a first position of the at least one position of the throttle measured by the position sensor,
      determining a second air flow in the air intake system from a first pressure of the at least one pressure in the manifold measured by the pressure sensor,
      determining a reference measurement correction factor, selected such that when the reference measurement correction factor is added to a measurement of one of the two air flows in a determination of a third corrected air flow based on the same determination as said one of the two air flows, the third corrected air flow is substantially equal to the other one of the two air flows,
      correcting a theoretical injection command of the richness controller, determined from one of the first and second air flows, by adding a reference injection correction factor to obtain a substantially stoichiometric air-fuel mixture based on measurements from the richness probe, and
      after at least one determined duration during which the determining the first air flow, the determining the second air flow, the determining the reference measurement correction factor and the correcting the theoretical injection command are performed several times, storing the reference measurement correction factor and the reference injection correction factor; and
   implementing a second set of steps during conventional operation of the engine when the engine is in said predetermined conditions, the second set of steps comprising:
      determining another first air flow in the air intake system from a second position of the at least one position of the throttle measured by the position sensor, determining another second air flow in the air intake system from a second pressure of the at least one pressure in the manifold measured by the pressure sensor, determining a current measurement correction factor, selected such that when the current measurement correction factor is added to a measurement of the one of the two other air flows that corresponds to the one of the two air flows in a determination of another third corrected air flow based on the same determination as said one of the two other air flows, the other third corrected air flow is substantially equal to the other one of the two other air flows, correcting another injection command of the richness controller determined from the corresponding one of the two other air flows by adding a current injection correction factor to obtain another substantially stoichiometric air-fuel mixture based on measurements from the richness probe, and when an absolute value of the difference between the reference measurement correction factor and the current measurement correction factor is greater than a first predetermined threshold, establishing the maintenance diagnosis, and calculating an absolute value of the difference between the reference injection correction factor and the current injection correction factor, and one of:

1) when the absolute value of the difference between the reference injection correction factor and the current injection correction factor is less than a second predetermined threshold, when the other injection command is determined from the other first air flow obtained from the second position of the throttle, establishing a diagnosis of a play at the at least one intake valve, and when the other injection command is determined from the other second air flow obtained from the manifold pressure, establishing a diagnosis of clogging of the throttle, and 2) when the absolute value of the difference between the reference injection correction factor and the current injection correction factor is greater than said second predetermined threshold, when the other injection command is determined from the other first air flow obtained from the second position of the throttle, establishing a diagnosis of clogging of the throttle, and when the other injection command is determined from the other second air flow obtained from the manifold pressure, establishing a diagnosis of a play at the at least one intake valve.

2. The method for establishing the maintenance diagnosis as claimed in claim 1, wherein the predetermined conditions of the engine comprise an engine temperature between two engine temperature predetermined thresholds, an air temperature between two air temperature predetermined thresholds, an air flow in the air intake system between two air flow predetermined thresholds, an engine speed between two engine speed predetermined thresholds for a duration at least equal to a duration predetermined threshold, and an engine load between two engine load predetermined thresholds.

3. The method for establishing the maintenance diagnosis as claimed in claim 1, wherein, on each switching on of the engine, the current measurement correction factor and the current injection correction factor are initialized respectively to the current measurement correction factor and the current injection correction factor calculated in an iteration prior to switching off the engine.

4. The method for establishing the maintenance diagnosis as claimed in claim 1, wherein the storing is only implemented after the engine has been switched off.

5. A non-volatile computer-readable medium on which is stored a computer program comprising code instructions that, when executed by a computer comprising a memory, causes the computer to perform the method as claimed in claim 1.

6. A computer configured to control switching on of the engine, to control a richness controller, and to receive measurements from a position sensor of a throttle, a manifold pressure sensor, and a richness probe, the computer being configured to implement the steps of the method as claimed in claim 1.

7. An engine comprising:
a computer implementing the steps of the method as claimed in claim 1;
a throttle which regulates the air access into an air intake system of said engine;
a position sensor which measures the position of the throttle;
a manifold in fluidic communication with the throttle;
a pressure sensor which measures the pressure in the manifold;
at least one intake valve;
a richness probe which measures an oxygen level; and
a richness controller configured to modify proportions of air and fuel in the air-fuel mixture.

8. A lawn-mower comprising the engine of claim 7.

9. The method for establishing the maintenance diagnosis as claimed in 2, wherein, on each switching on of the engine, the current measurement correction factor and the current injection correction factor are initialized respectively to the current measurement correction factor and the current injection correction factor calculated in an iteration prior to switching off the engine.

10. The method for establishing the maintenance diagnosis as claimed in claim 2, wherein the storing is only implemented after the engine has been switched off.

11. The method for establishing the maintenance diagnosis as claimed in claim 3, wherein the storing is only implemented after the engine has been switched off.

12. A non-volatile computer-readable medium on which is stored a computer program comprising code instructions that, when executed by a computer comprising a memory, causes the computer to perform the method as claimed in claim 2.

13. A non-volatile computer-readable medium on which is stored a computer program comprising code instructions that, when executed by a computer comprising a memory, causes the computer to perform the method as claimed in claim 3.

14. A non-volatile computer-readable medium on which is stored a computer program comprising code instructions that, when executed by a computer comprising a memory, causes the computer to perform the method as claimed in claim 4.

15. A computer configured to control switching on of the engine, to control a richness controller, and to receive measurements from a position sensor of a throttle, a manifold pressure sensor, and a richness probe, the computer being configured to implement the steps of the method as claimed in claim 2.

16. A computer configured to control switching on of the engine, to control a richness controller, and to receive measurements from a position sensor of a throttle, a manifold pressure sensor, and a richness probe,
the computer being configured to implement the steps of the method as claimed in claim 3.

17. A computer configured to control switching on of the engine, to control a richness controller, and to receive measurements from a position sensor of a throttle, a manifold pressure sensor, and a richness probe,
the computer being configured to implement the steps of the method as claimed in claim 4.

18. An engine comprising:
a computer implementing the steps of the method as claimed in claim 2;
a throttle which regulates the air access into an air intake system of said engine;
a position sensor which measures the position of the throttle;
a manifold in fluidic communication with the throttle;
a pressure sensor which measures the pressure in the manifold;
at least one intake valve;
a richness probe which measures an oxygen level; and
a richness controller configured to modify proportions of air and fuel in the air-fuel mixture.

19. An engine comprising:
a computer implementing the steps of the method as claimed in claim 3;
a throttle which regulates the air access into an air intake system of said engine;
a position sensor which measures the position of the throttle;
a manifold in fluidic communication with the throttle;
a pressure sensor which measures the pressure in the manifold;
at least one intake valve;
a richness probe which measures an oxygen level; and
a richness controller configured to modify proportions of air and fuel in the air-fuel mixture.

20. An engine comprising:
a computer implementing the steps of the method as claimed in claim 4;
a throttle which regulates the air access into an air intake system of said engine;
a position sensor which measures the position of the throttle;
a manifold in fluidic communication with the throttle;
a pressure sensor which measures the pressure in the manifold;
at least one intake valve;
a richness probe which measures an oxygen level; and
a richness controller configured to modify proportions of air and fuel in the air-fuel mixture.

\* \* \* \* \*